United States Patent
Murata et al.

(10) Patent No.: US 6,903,833 B1
(45) Date of Patent: Jun. 7, 2005

(54) IMAGE DATA DISTRIBUTION SYSTEM AND THE METHOD THEREOF

(75) Inventors: Kazuyuki Murata, Kyoto-fu (JP); Hideyuki Kuwano, Osaka-fu (JP); Yuji Okada, Hyogo-ken (JP); Naoki Takahashi, Osaka-fu (JP); Takehito Yamaguchi, Osaka-fu (JP); Kenji Hisatomi, Osaka-fu (JP); Joji Tanaka, Osaka-fu (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/352,949

(22) Filed: Jul. 14, 1999

(30) Foreign Application Priority Data

Jul. 16, 1998 (JP) .......................................... 10-202334

(51) Int. Cl.[7] .......................... G06K 15/02; G06F 3/12; G06F 13/00
(52) U.S. Cl. ..................... 358/1.15; 358/1.14; 358/403; 358/440
(58) Field of Search .............................. 358/1.15, 1.14, 358/403, 440; 709/223–224, 319, 203, 212, 213, 228, 230; 710/19, 46, 7, 8

(56) References Cited

U.S. PATENT DOCUMENTS

| 5,757,510 | A | | 5/1998 | Okada ......................... 558/402 |
|---|---|---|---|---|
| 5,930,752 | A | * | 7/1999 | Kawaguchi et al. ......... 704/235 |
| 6,009,485 | A | * | 12/1999 | Hosotsubo ................... 710/100 |
| 6,154,463 | A | * | 11/2000 | Aggarwal et al. ........... 370/408 |
| 6,198,542 | B1 | * | 3/2001 | Tabata ........................ 358/1.15 |
| 6,199,164 | B1 | * | 3/2001 | Nishimoto et al. .......... 713/200 |
| 6,269,369 | B1 | * | 7/2001 | Robertson .................... 707/10 |
| 6,311,208 | B1 | * | 10/2001 | Miyamoto et al. ........... 709/203 |

FOREIGN PATENT DOCUMENTS

JP      5-114986      5/1993      ............ H04N/1/32

* cited by examiner

*Primary Examiner*—Douglas Tran
(74) *Attorney, Agent, or Firm*—McDermott Will & Emery LLP

(57) ABSTRACT

An image data distribution system wherein an image server has information on destination group formed of members selected from among a plurality of image communication apparatuses. The information is memorized on a storage memory and the image data will be sent out to the respective members of the destination group specified by the destination information. In this image data distribution system, the distribution managing element sends all the distribution destination group names to a digital combination unit when a request for registration with a group is received from input manipulation element provided in the digital combination unit and registers the digital combination unit with a specified distribution destination group when the distribution destination group is specified by the digital combination unit.

5 Claims, 19 Drawing Sheets

Fig.14

All distribution destinaons
File name "all. rec"

| | |
|---|---|
| jinji.hqs.mei.co.jp; | the personnel department, the head office |
| keiri.hqs.mei.co.jp; | the accounting department, the head office |
| sohmu.hqs.mei.co.jp; | the general affairs department, the head office |
| sale1.hqs.mei.co.jp; | sales department 1, the head office |
| sale2.hqs.mei.co.jp; | sales department 2, the head office |
| saleo.hqs.mei.co.jp; | the overseas department, the head office |
| devl1.hqs.mei.co.jp; | development section 1 of the development department, the head office |
| devl2.hqs.mei.co.jp; | development section 2 of the development department, the head office |
| devl3.hqs.mei.co.jp; | development section 3 of the development department, the head office |
| devl4.hqs.mei.co.jp; | development section 4 of the development department, the head office |
| sale1.osk.mei.co.jp; | the sales department, the Osaka branch |
| devl1.osk.mei.co.jp; | the development department, the Osaka branch |
| soumu.osk.mei.co.jp; | the general affairs department, the Osaka branch |
| sale1.osk.mei.co.jp; | the sales department, the Nagoya branch |
| devl1.ngy.mei.co.jp; | the development department, the Nagoya branch |
| soumu.ngy.mei.co.jp; | the general affairs department, the Nagoya branch |
| sales.hkd.mei.co.jp; | the Hokkaido office |
| sales.sdi.mei.co.jp; | the Sendai office |
| sales.ngt.mei.co.jp; | the Niigata office |
| sales.utn.mei.co.jp; | the Utsunomiya office |
| sales.szk.mei.co.jp; | the Shizuoka office |
| sales.fko.mei.co.jp; | the Fukuoka office |
| sales.hrs.mei.co.jp; | the Hiroshima office |

Fig.15

All sales-related places
File name "eigyou_all. rec"
sale1.hqs.mei.co.jp;         sales department 1, the head office
sale2.hqs.mei.co.jp;         sales department 2, the head office
saleo.hqs.mei.co.jp;         the overseas department, the head office
sale1.osk.mei.co.jp;         the sales department, the Osaka branch
sale1.ngy.mei.co.jp;         the sales department, the Nagoya branch
sales.hkd.mei.co.jp;         the Hokkaido office
sales.sdi.mei.co.jp;         the Sendai office
sales.ngt.mei.co.jp;         the Niigata office
sales.utn.mei.co.jp;         the Utsunomiya office
sales.szk.mei.co.jp;         the Shizuoka office
sales.fko.mei.co.jp;         the Fukuoka office
sales.hrs.mei.co.jp;         the Hiroshima office

Fig.16

All sales office
File name "eigyou_syo. rec"
sales.hkd.mei.co.jp;         the Hokkaido office
sales.sdi.mei.co.jp;         the Sendai office
sales.ngt.mei.co.jp;         the Niigata office
sales.utn.mei.co.jp;         the Utsunomiya office
sales.szk.mei.co.jp;         the Shizuoka office
sales.fko.mei.co.jp;         the Fukuoka office
sales.hrs.mei.co.jp;         the Hiroshima office

Fig.17

Product evelopment-related places
File name "develop. rec"

| | |
|---|---|
| devl1.hqs.mei.co.jp; | development section 1 of the development department , the head office |
| devl2.hqs.mei.co.jp; | development section 2 of the development department , the head office |
| devl3.hqs.mei.co.jp; | development section 3 of the development department , the head office |
| devl4.hqs.mei.co.jp; | development section 4 of the development department , the head office |
| devl1.ngy.mei.co.jp; | the development section of the Nagoya branch |

Fig.18

| | |
|---|---|
| All distribution destinations | all.rec |
| All sales-related places | eigyou_all.rec |
| All sales office | eigyou_syo.rec |
| Product development-related places | develop.rec |

Fig.19

| Image ID | NO. of pages | Image size | Registration method | Date of registration | Time of registration | User ID | Access right | Media ID | Link destination | Link source |
|---|---|---|---|---|---|---|---|---|---|---|
| 00000001 | 3 | A4 | COPY | 1997.01.29 | 20:10:45 | 0003 | OWNER | 0000 | 00000000 | 00000000 |
| 00000002 | 4 | B4 | FAX RECEIVE | 1997.02.01 | 06:05:05 | 0000 | FREE | 0000 | 00000000 | 00000000 |
| 00000003 | 6 | A4 | FAX SEND | 1997.02.01 | 09:17:55 | 0006 | GROUP | 0000 | 00000000 | 00000000 |
| 00000004 | 3 | A4R | PRINT | 1997.02.03 | 10:10:09 | 0003 | GROUP | 0001 | 00000005 | 00000000 |
| 00000005 | 3 | A4R | COPY | 1997.02.03 | 11:30:30 | 0003 | GROUP | 0000 | 00000000 | 00000004 |
| | | | | | | | | | | |

128a: attribute table

Fig.20

IMAGE DATA DISTRIBUTION SYSTEM AND METHOD

BACKGROUND OF THE INVENTION 5  1. Field of the Invention
   The present invention relates to an image data distribution system and method of distributing image data to a plurality of image communication units connected thereto through a network.

10  2. Description of the Prior Art
   FIG.21 shows a typical network arrangement of the prior art image data distribution system (facsimile broadcast system). In this example, a document (image data) is sent from the facsimile unit 1002 at the head office to facsimile unit 1003 at branch office A, facsimile unit 1004 at branch office B and
15  facsimile unit 1005 at branch office C. The system works the following way.
   The facsimile unit 1002 at the head office reads a document as destination group member numbers are specified. The destination group member numbers and the document are then sent to a facsimile data distribution exchanger 1001. The
20  image data sent is first stored in storage means such as a hard disk (not shown).
   The facsimile data distribution exchanger 1001 has a list of facsimile numbers — the facsimile numbers of the facsimile unit 1003, the facsimile unit 1004 and the facsimile unit 1005 — corresponding to the destination group member numbers. The
25  facsimile data is distributed to

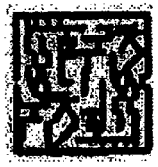

IMAGE DATA DISTRIBUTION SYSTEM AND THE METHOD THEREOF

BACKGROUND OF THE INVENTION

1. Field of the Invention

The present invention relates to an image data distribution system and method of distributing image data to a plurality of image communication units connected thereto through a network.

2. Description of the Prior Art

FIG. 21 shows a typical network arrangement of the prior art image data distribution system (facsimile broadcast system). In this example, a document (image data) is sent from the facsimile unit 1002 at the head office to facsimile unit 1003 at branch office A, facsimile unit 1004 at branch office B and facsimile unit 1005 at branch office C. The system works the following way.

The facsimile unit 1002 at the head office reads a document as destination group member numbers are specified. The destination group member numbers and the document are then sent to a facsimile data distribution exchanger 1001. The image data sent is first stored in storage means such as a hard disk (not shown).

The facsimile data distribution exchanger 1001 has a list of facsimile numbers—the facsimile numbers of the facsimile unit 1003, the facsimile unit 1004 and the facsimile unit 1005—corresponding to the destination group member numbers. The facsimile data is distributed to the facsimile units of the group members one after another at those facsimile numbers given in the list. That is, the facsimile data distribution exchanger 1001 sends the image data stored in the storage means to the facsimile unit 1003 at branch office A the facsimile unit 1004 at branch office B and the facsimile unit 1005 at branch office C one after another though the public switched telephone network 1000.

That way, one and the same data is transmitted to a plurality of facsimile units from the facsimile unit 1002 of the head office.

In case the facsimile data distribution exchanger 1001 is connected with the public switched telephone network 1000 through a plurality of circuit lines, the same data can be sent to a plurality of facsimile units simultaneously through those circuit lines and the public switched telephone network 1000.

Meanwhile, when a new branch facsimile unit is to be added to the list of the destinations, the list of the group member numbers or branch numbers in the facsimile data distribution exchanger 1001 is revised or changed. With the prior art image data distribution system—the facsimile broadcast system—, there arose a variety of inconveniences in the process of changing the list. For example, the necessary work had to be done by the user—the system operator or the like himself or herself. The procedure was very troublesome and allowed no mistake in inputting facsimile numbers. Otherwise, the system would not work normally and image data would not be delivered to the intended facsimile unit. In addition, the changes in the list were not be reflected automatically in the respective facsimile units, and the system operator himself or herself had to notify each branch of the changes effected.

Furthermore, the facsimile broadcast system which used the public telephone circuits and the facsimile communication protocol for transmission of image data, presented such problems as long communication time, high costs and low resolution or poor image quality.

SUMMARY OF THE INVENTION

The present invention addresses those problems, and it is an object of the invention to provide an image data distribution system and method in which destinations can be changed by a simple procedure and which can send images in high-resolution in a shorter time.

To achieve the foregoing object, the present invention is built on an image data distribution system as shown in FIG. 1. In the system, groups of destinations are formed of members selected from among a plurality of image communication apparatuses capable of sending and receiving image data. An image server 110 has information on the destination groups and group members memorized on a storage memory 113 thereon. And when the image server 110 receives a request for distribution of image data together with destination information through the network from one of the image communication apparatuses—a digital multifunction apparatus 120, for example—the image data will be sent out to the respective members of the destination group specified by the destination information.

In this image data distribution system, distribution managing means 112 provided on the side of the image server 110 sends back all the destination group names to the digital multifunction apparatus 120 for registration if so requested by input manipulation means 125 provided in the digital multifunction apparatus 120. A destination group is specified by the digital multifunction apparatus 120, and the digital multifunction apparatus 120 will be registered with the specified destination group. That way, it is possible to register a new destination group member with the destination group from the digital multifunction apparatus 120.

The image data distribution system may be such equipment as a personal computer, printing apparatus and facsimile unit in addition to the digital multifunction apparatus.

BRIEF DESCRIPTION OF THE DRAWINGS

FIG. 14 is an example showing the details of the file "all. rec" on all distribution destinations.

FIG. 15 is an example showing the details of the file "eigyou_all. rec" on all sales-related places.

FIG. 16 is an example showing the details of the file "eigyou_syo. rec" on all sales offices.

FIG. 17 is an example showing the details of the file "develop. rec" on product development-related places.

FIG. 18 is a table of distribution destination group names and file names.

FIG. 19 is a table of attributes.

FIG. 20 is an example of the mark sheet.

DESCRIPTION OF THE PREFERRED EMBODIMENTS

Now, the embodiments of the present invention will be described with reference to the drawings.

(1) Overall Arrangement
(1. 1) Arrangement of Network

Figure 2:
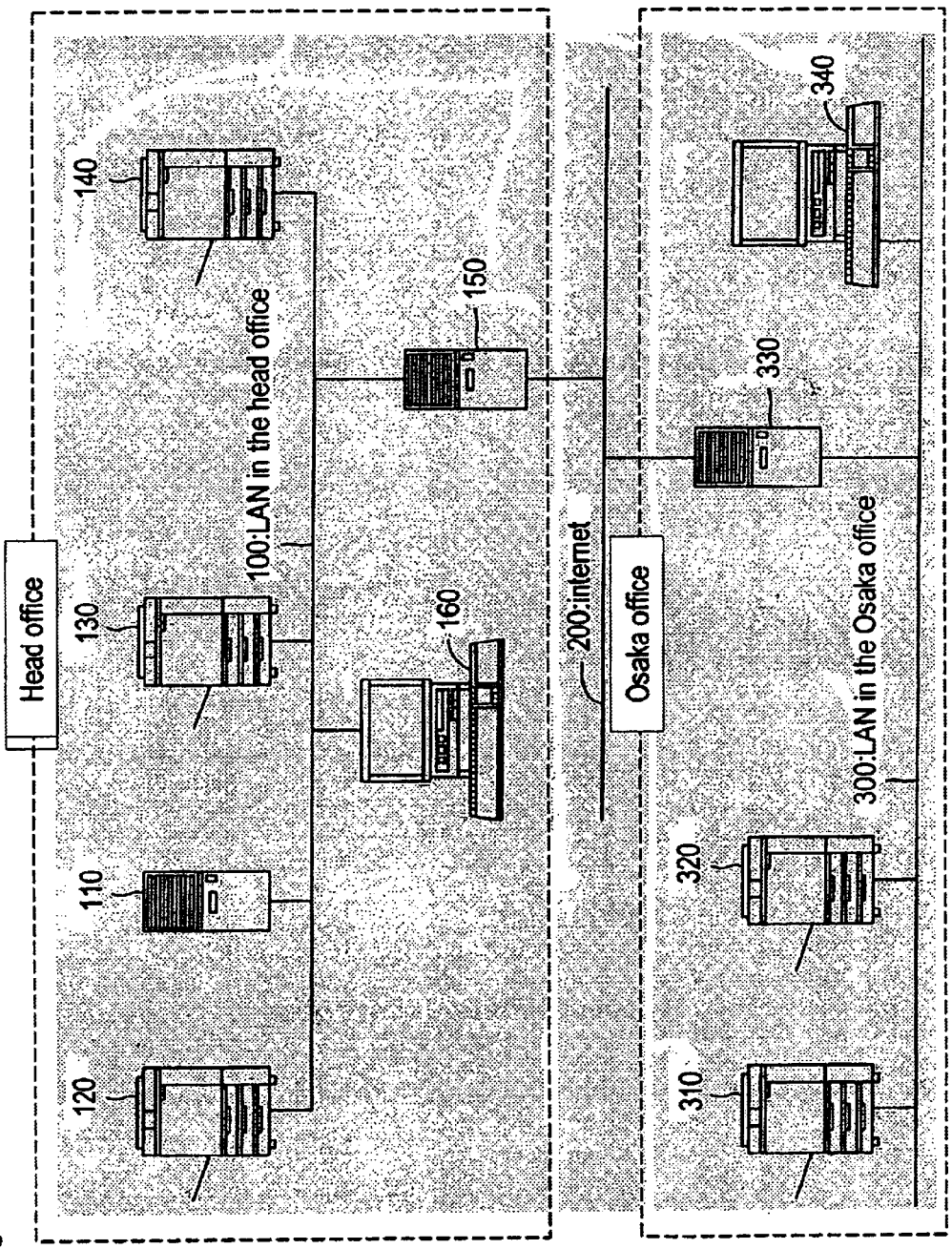
FIG. 2 is a block diagram showing the network arrangement of the image data distribution system according to the present invention.

FIG. 2 shows a network of a data distribution system embodying the present invention. LAN 100 in the head office and LAN 300 in the Osaka office are connected with each other via the internet 200 through a gateway 150 and another gateway 330. LAN 100 in the head office is connected to digital multifunction apparatuss 120, 130, 140, an image server 110 and a personal computer 160. LAN 300 in the Osaka office is connected to digital multifunction apparatuss 310, 320 and a personal computer 340.

The example shown in FIG. 2 is not restrictive with regard to the number of digital multifunction apparatuss and personal computers connected with LAN and the number of LANs connected to the internet.

(1, 2) Image Server

Figure 1:
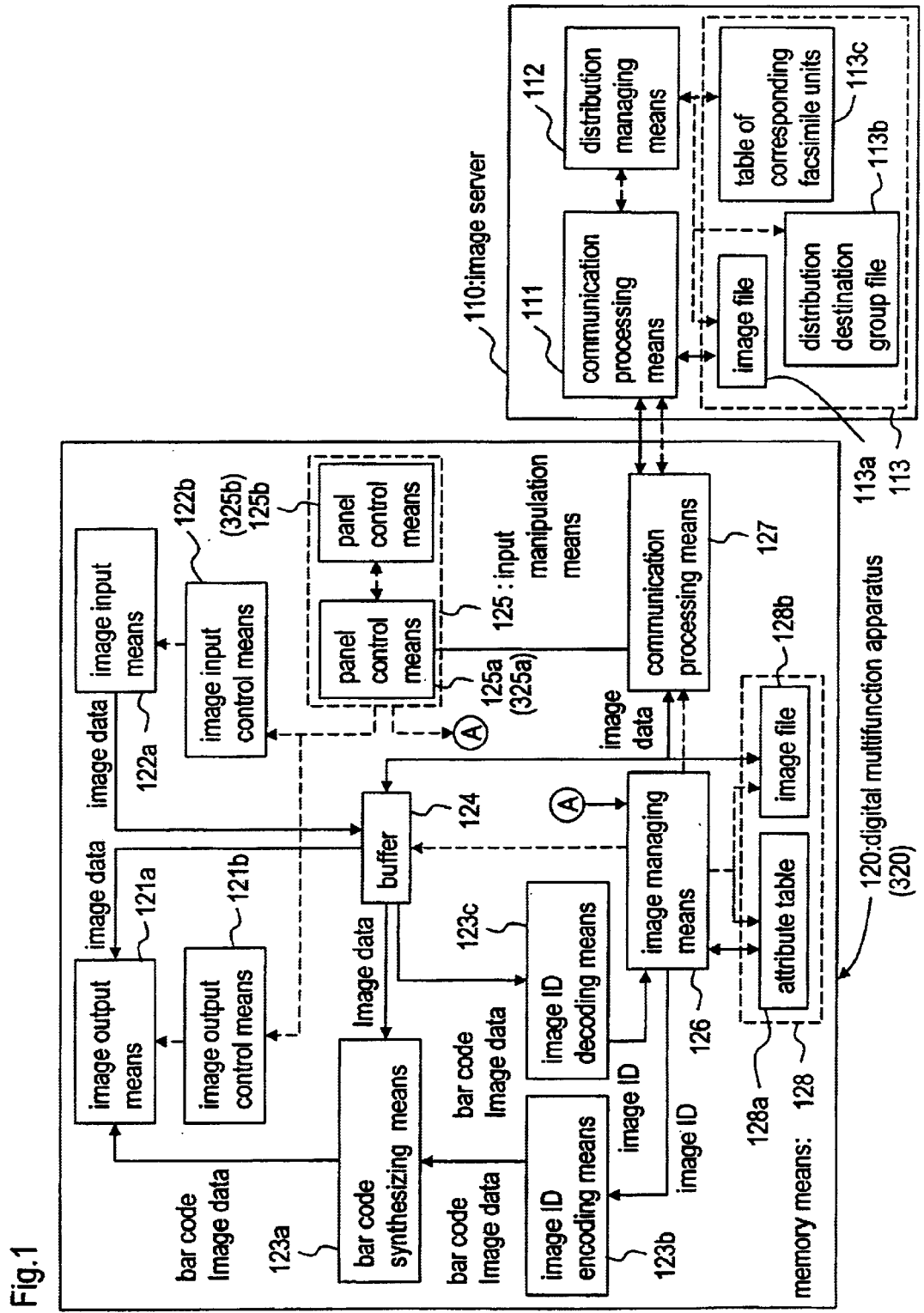
FIG. 1 is a schematic functional block diagram of an image data distribution system embodying the present invention.

The image server 110 is provided with a large-capacity storage memory 113 such as hard disk as shown in FIG. 1. The image server 110 has the following files and table on a storage memory 113: a plurality of distribution destination group files 113b containing information on destination group members and a table 113c of destination group names and file names with the distribution destination group names and destination group files enumerated side by side (see FIG. 18). There will now be described the details of the distribution destination group files 113b with reference to FIGS. 14 to 17.

FIGS. 14, 15, 16 and 17 show the details of the distribution destination group files 113b under the titles "all. rec," "eigyou_all. rec," "eigyou_syo. rec" and "develop. rec" respectively. The files or lists start with two comments lines marked "#". The first lines indicate the destination group names. The second comments lines show the names of the distribution destination group files 113b. Given in the third and subsequent lines are the particular addresses representing the respective image communication apparatuses— "destination network domain name; destination name." The destination network domain name is information to specify the destination image communication apparatus on the network. The above arrangement may be substituted by "IP address; destination name" with the same results. The file "all. rec" shown in FIG. 14 is prepared with all the image communication apparatuses—controlled by the image data distribution system—as destinations. The file "eigyou_all. rec" shown in FIG. 15 is on a group of all the sales-related places as destinations. The file "eigyou_syo. rec" shown in FIG. 16 is on a group formed with all the sales offices as destinations. The file "develop. rec" shown in FIG. 17 is on a group with product development-related places as destination members.

If there comes up a new entry to add, for example, sales department 3 of the head office, a sale-related place (network domain name: "sale3. hqs. mei. co. jp"), entry will be made in the files "all. rec" and "eigyou_all. rec" under the name "sale3. hqs. mei. co. jp; sales department 3 of the head office."

Those distribution destination group files 113b are prepared as by a text editor that works on the image server 110 and stored in a specific directory.

(1. 3) Digital Multifunction Apparatus

The digital multifunction apparatus is an apparatus built based on a digital duplicator by combining digital image equipment such as a facsimile unit and printer to save space. Its development history shows that an apparatus mounted with a facsimile function first appeared, followed by a unit that worked as network printer. Recent years have seen the development of an apparatus with a function of storing image data.

The digital multifunction apparatus used in the present image data distribution system is also provided with the aforesaid function and, in addition, works in the following way when storing image data That is, the digital multifunction apparatus is so designed that image data inputted from image input means 122a is given a file name based on an image identification (ID) to specify the image data and then stored as an image file 128b in memory means 128 such as a hard disk. At the same time, the image ID is changed into a bar code. Then, the bar code is copied at a specific position on the first page or some other page with characteristic images, and that page is printed out as mark sheet (as in FIG. 20) by image output means 121a such as a printer. When the image file 128b is taken out from memory means 128, the bar code on the mark sheet is read by image input means 122a and the read bar code is converted into the image ID to specify the object image data The digital multifunction apparatus adopted in the present image data distribution system is provided with a number of components (not shown) such as facsimile transmit-receive means. But they are not the object of the present invention and will not be described.

(2) Various Processes

There will now be described the configuration of the image data distribution system of the present invention as well as the operating processes.

(2. 1) Process for Distribution of Image Data

A description will be made of the process when image data is to be distributed to the members of a specific group from the digital multifunction apparatus 120 of the head office.

Figure 6:
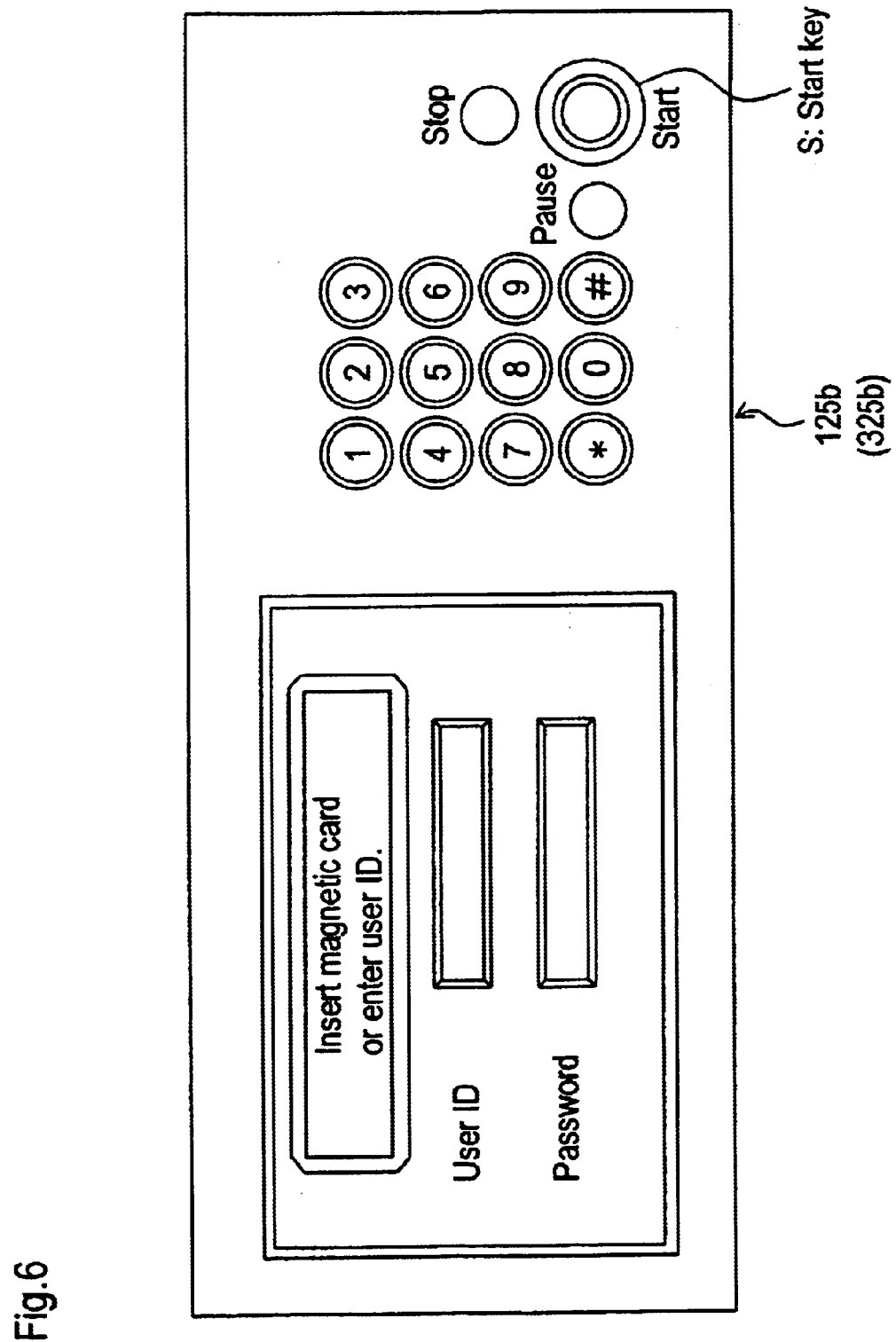
FIG. 6 is an illustration of a control panel with a dialog box for the user to input his or her identification code (ID).

Panel control means 125a in the digital multifunction apparatus 120 first displays a user ID entry box as shown in FIG. 6 on the control panel 125b made up of an LCD with a touch panel and a plurality of keys including ten keys. When the start key S on the control panel 125b is pressed after the user ID and password are inputted by the keys, a dialog box for mode selection will appear. It is noted that the means of inputting the user ID and password is not limited to the keys. An alternative thereto may be a magnetic card reader provided in the control panel 125b into which a registered magnetic card is inserted.

Figure 7:
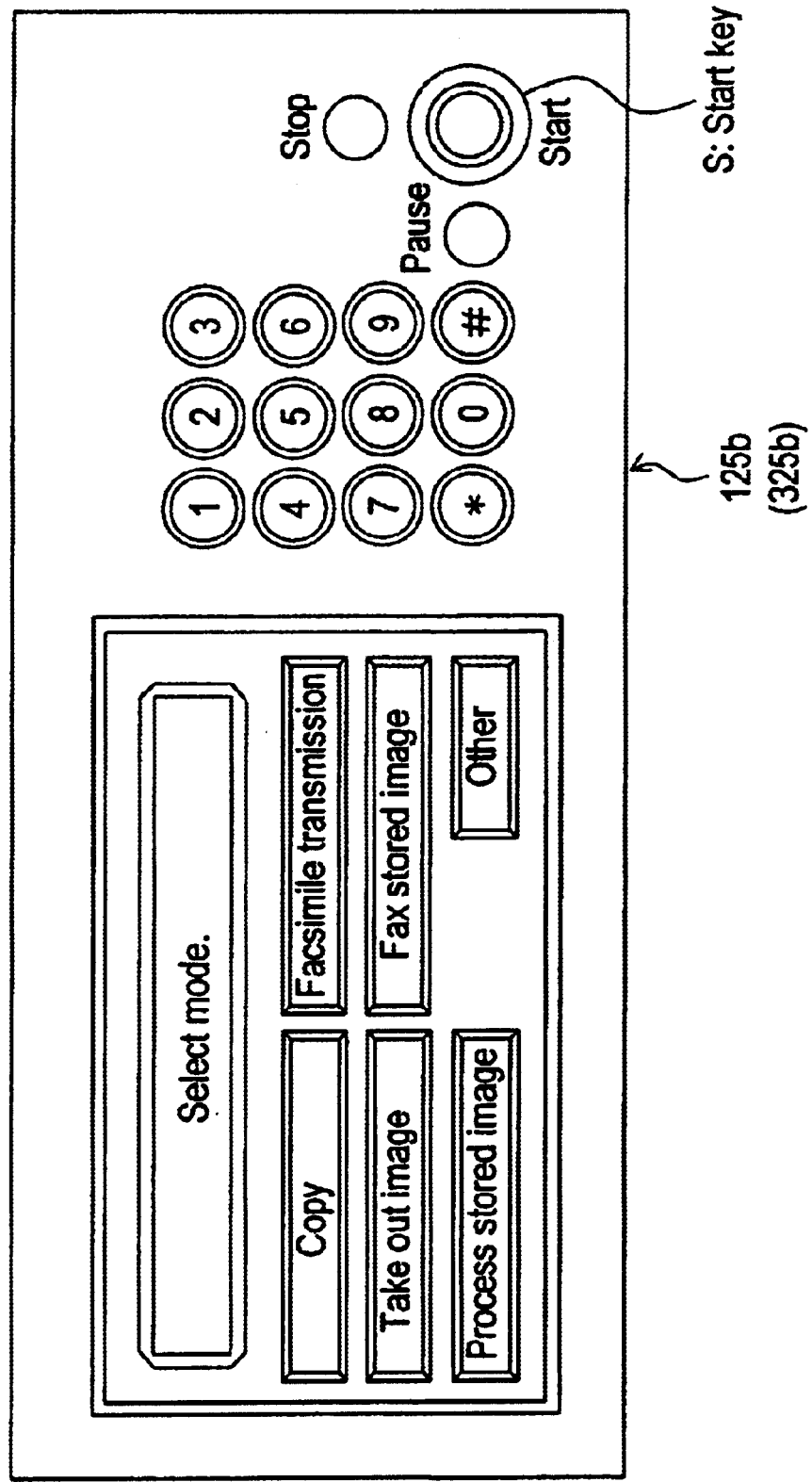
FIG. 7 is an illustration of a control panel with a dialog box for selection of a mode.

The dialog box for mode selection (FIG. 7) asks which of the following procedures to take: "Copy," "facsimile transmission," "Take out image," "Fax stored image," "Process stored image" and "Others." The mode "Take out image" is to print out an image file 128*b* on memory means 128 by image output means 121*a*. The mode "fax stored image" is to send an image file 128*b* on memory means 128 by facsimile transmit-receive means (not shown). The mode "Process stored image" is to transfer or copy an image file 128*b* on memory means 128 to a magneto-optical disk (not shown). If "Others" is selected on the mode selection image (FIG. 7), there appears a dialog box for selection of a distribution mode as shown in FIG. 8.

Figure 8:
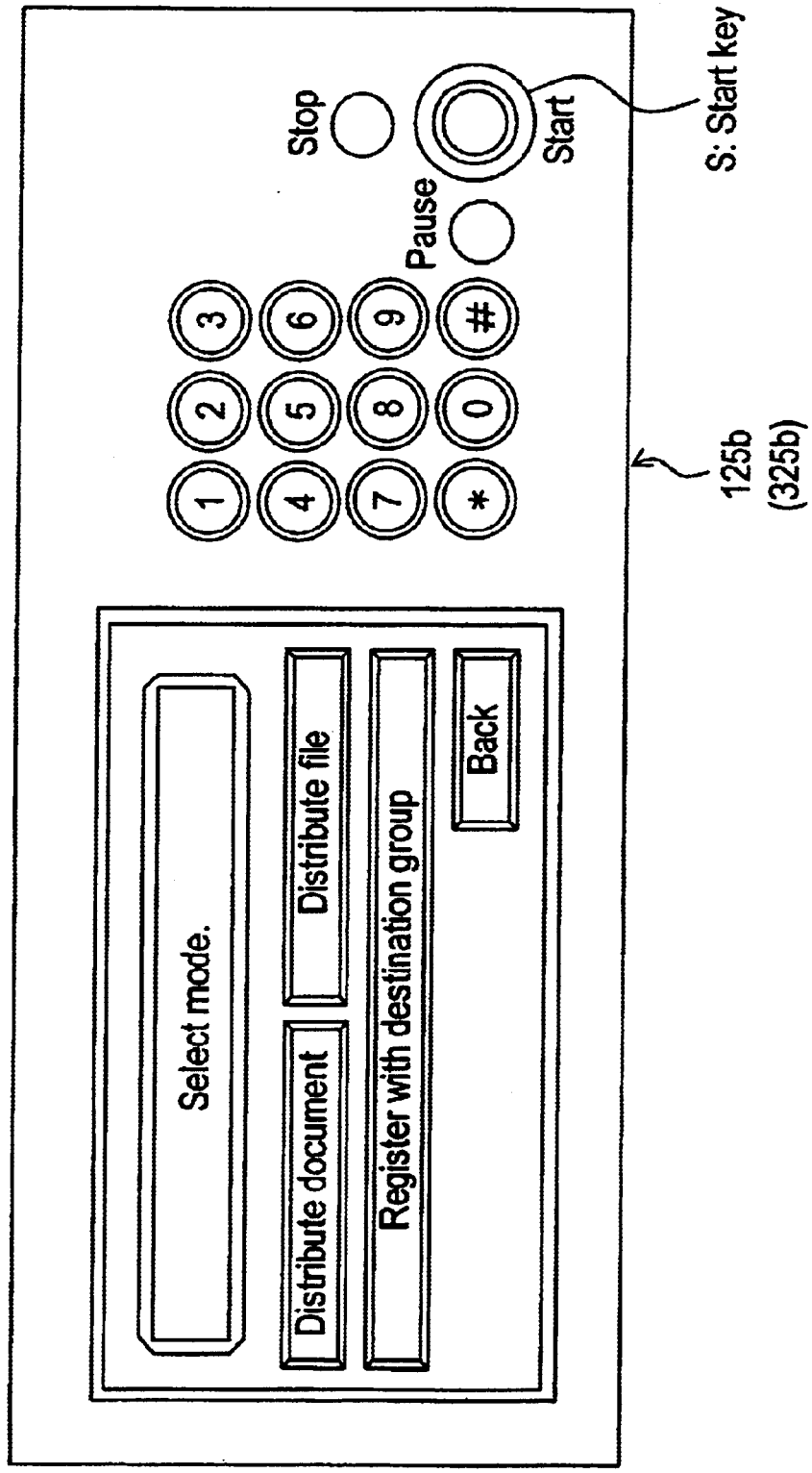
FIG. 8 is an illustration of a control panel with a dialog box for selection of a data distribution mode.

The dialog box for selection of a distribution mode as shown in FIG. 8 is the step which selects among the following modes: "Distribute document," "Distribute file" and "Register with destination group." The processes when the modes "Distribute file" and "Register with destination group" are selected will be described under (2. 2)—Distribution of image files stored by storage means— and (2. 3)—New registration with destination group members. In the following an explanation will be made of the process when the mode "Distribute data" is selected.

If the mode "Distribute data" is selected on the dialog box for selection of a distribution mode as shown in FIG. 8, panel control means 125*a* will direct the image server 110 to send information on the destination groups through communication processing means 127 and LAN 100 in the head office. It is understood that the network address of the image server 110 is registered on the digital multifunction apparatus 120 beforehand.

Receiving the aforesaid direction, distribution managing means 112 or the CPU of the image server 110 refers to the table 113*c* of distribution destination group names and file names (FIG. 18). The distribution managing means 112 then sends the following information to the digital multifunction apparatus 120 through communication processing means 111: the names of destination groups, that is, "all distribution destinations," "all sales-related places," "all sales offices" and "product development-related places."

Figure 9:
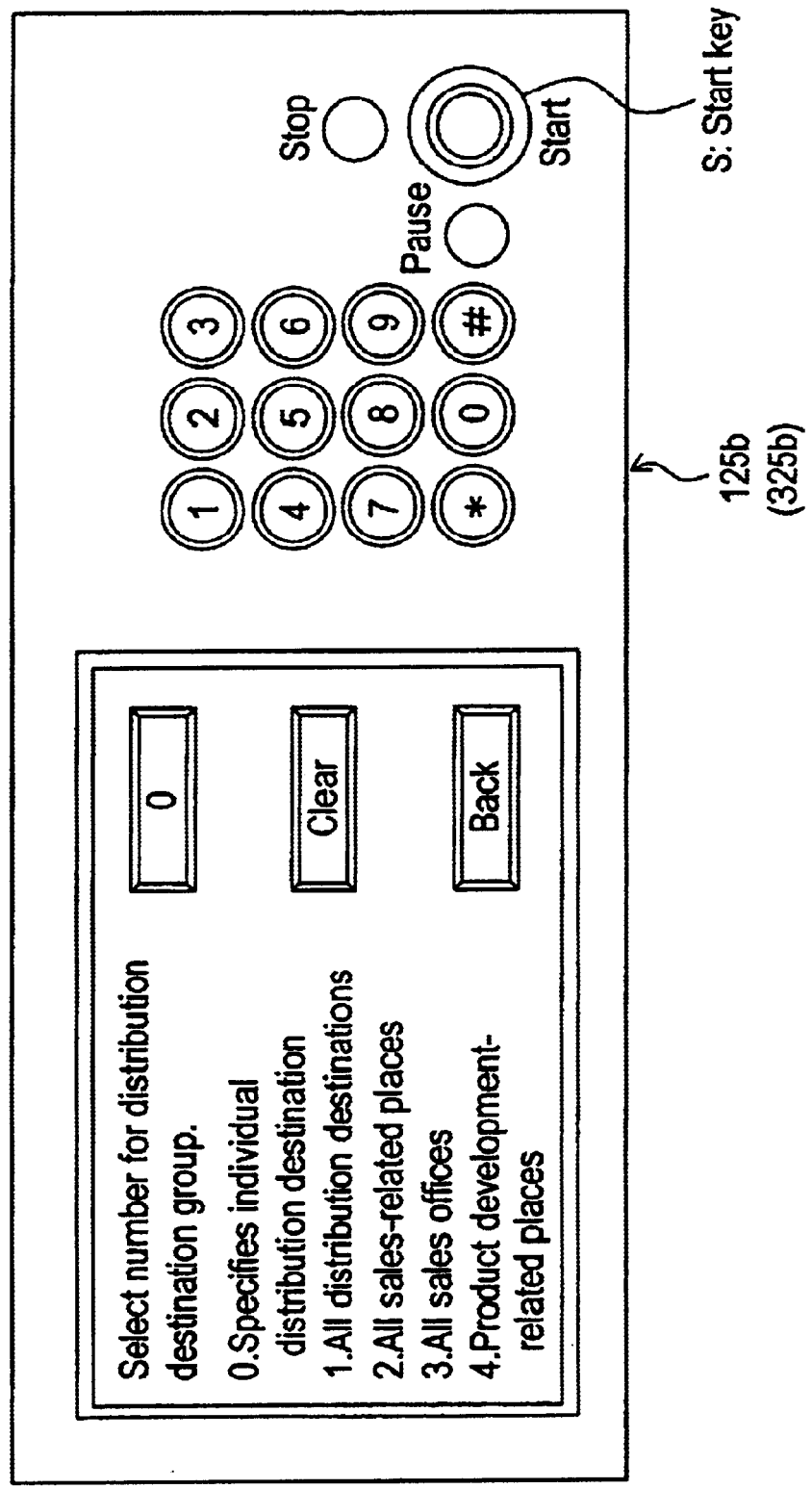
FIG. 9 is an illustration of a control panel with a dialog box for selection of destinations.

The names of destination groups are received by panel control means 125*a* through communication processing means 127. The panel control means 125*a* then displays on the control panel 125*b* a dialog box for selection of a destination based on the received names of destination groups. That is, there appears a dialog box for selection of a destination as shown in FIG. 9 on the control panel 125*b*. The character string "0: To specify individual destinations" alone is a character string displayed by panel control means 125*a* on its own—which is not based on the received names of destination groups. The character string "0: To specify individual destinations" is always displayed on the dialog box for selection of a destination which does not need to consult with the image server 110.

Then, the user places the data to distribute on an auto document feeder (ADF) provided on the image input means 122*a* of the digital multifunction apparatus 120, and inputs a destination group number through the keys. Different destination group numbers can be inputted on the same dialog box. And if the start key is pressed, the process flow shown in FIG. 3 will start. This process flow is applicable where a destination group number other than "0" is pressed, that is, data is to be sent to one of the destination groups "1" to "4."

(2. 1. 1) Process for Distribution to Destination Group

Figure 3:
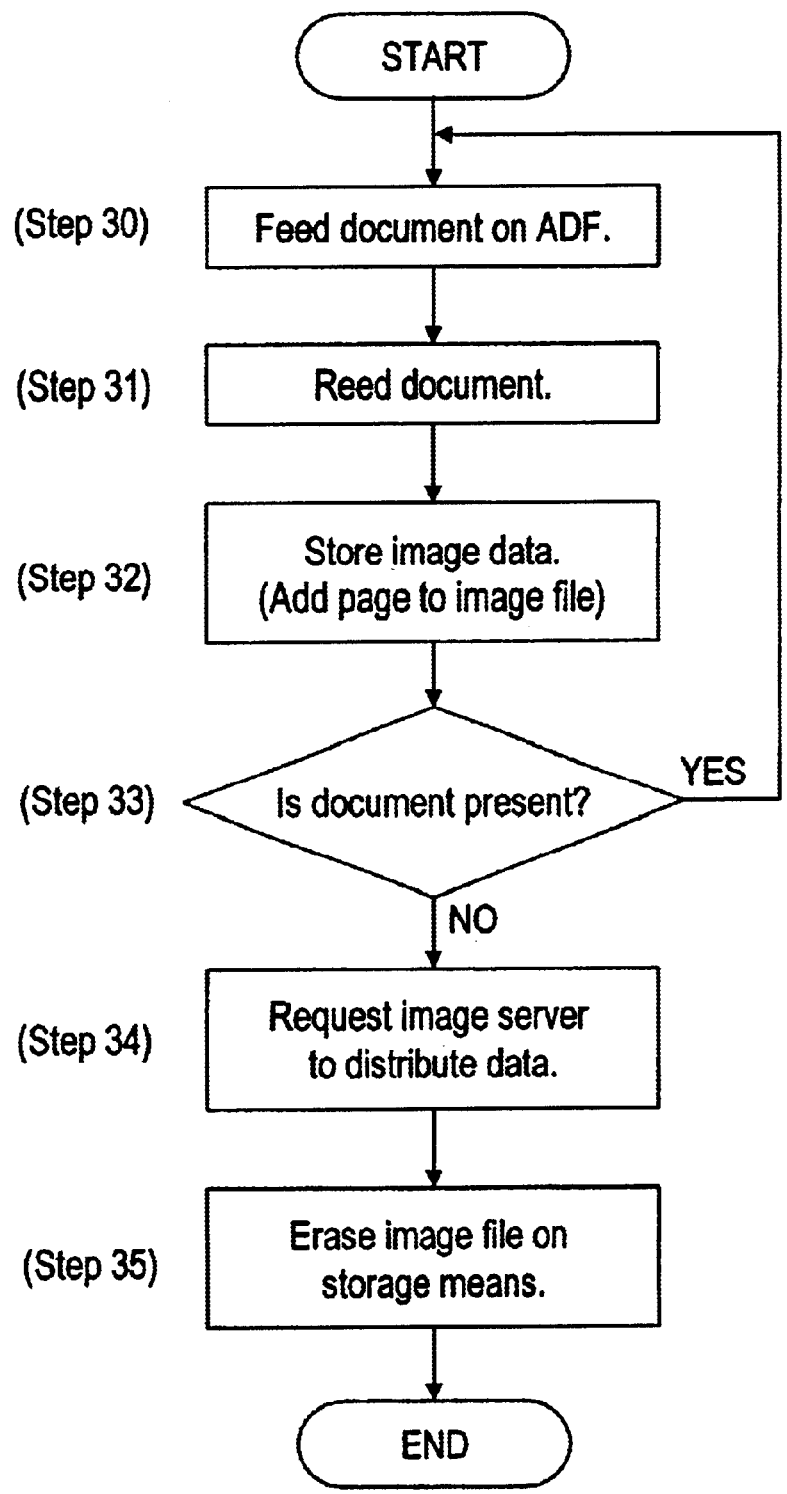
FIG. 3 is a flow chart showing the process of distributing data to the destination group members in the image data communication apparatus on the sender side.

If one of the numbers "1" to "4" is pressed on the dialog box for selection of a destination (FIG. 9), this information will be conveyed to panel control means 125*a*. The panel control means 125*a* then turns to image input control means 122*b*—which controls the drive of image input means 122*a*—to read the document and at the same time gives the aforesaid instruction information to image managing means 126. Then, image input control means 122*b* directs image input means 122*a* to read the document. So directed, image input means 122*a* stores the document—which is fed on the document glass by ADF—in the buffer 124 in the form of digitized image data (FIG. 3, Steps S 30–S 31).

Meanwhile, image managing means 126 generates an image ID made up of eight figures or the like and then stores the image data from the buffer 124 in memory means 128 as an image file 128*b* (with the file name corresponding to the image ID). The image managing means 126 then registers attribute information including "the image ID," "number of pages" and "image size" on an attribute table 128*a* (FIG. 19) on the memory means 128. This procedure is repeated and a plurality of pages of images are stored on the memory means 128 (FIG. 3, Steps S 32–S 33).

When the storing procedure is finished, the image managing means 126 transmits destination information to the image server 110. In other words, the image managing means 126 sends to the image server 110 the destination group name corresponding to the destination group number selected on the dialog box for selection of a destination (FIG. 9) along with the stored image file 128*b*. (In this case, the destination group name is one of the following: "all distribution destinations," "all sales-related places," "all sales offices" and "product development-related places.") When the transmission is over, the image managing means 126 erases the image file 128*b* on the memory means 128 (FIG. 3, Steps S 34–S 35).

There will now be described the process of the image server 110 which has received the aforesaid distribution direction with reference to the flow chart shown in FIG. 4.

Figure 4:
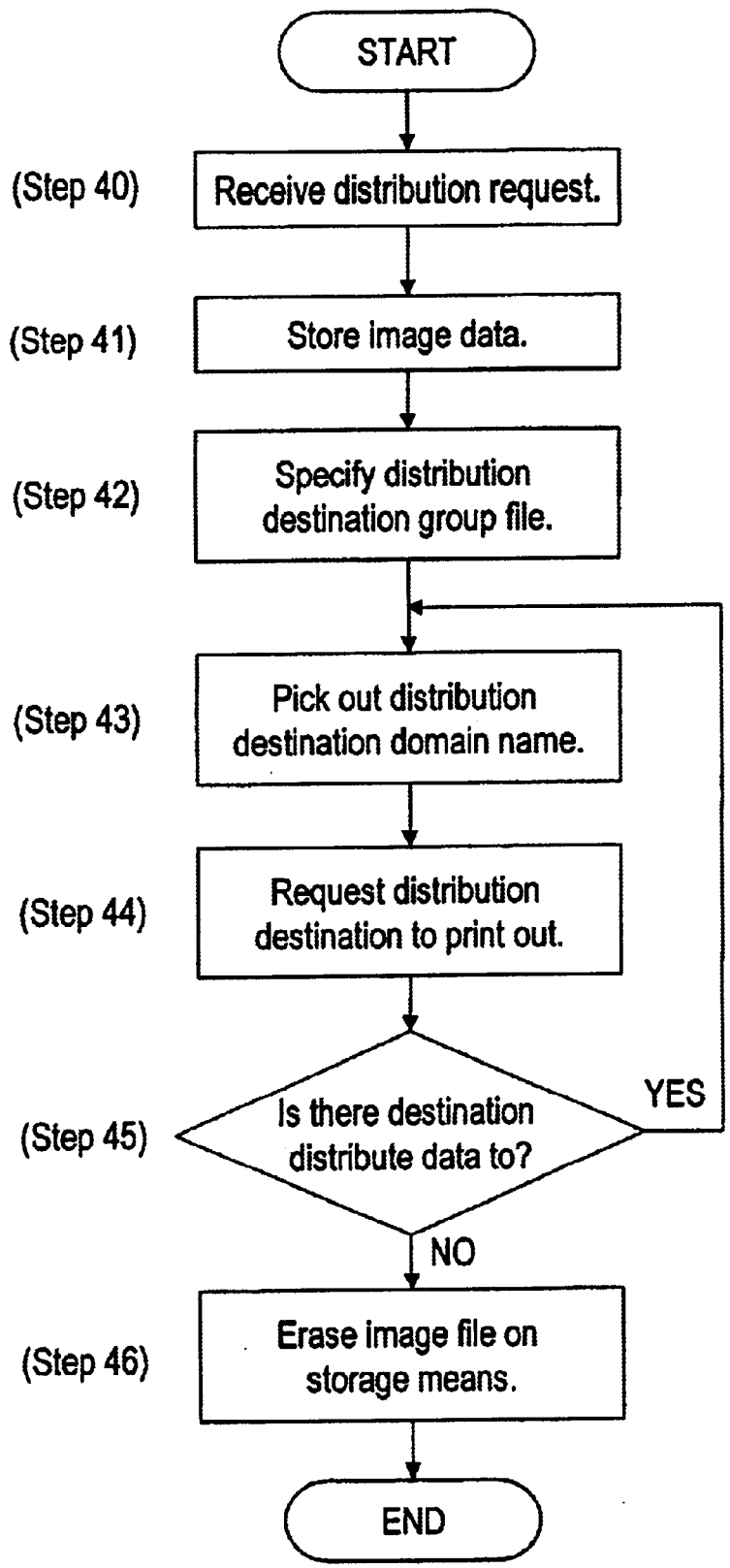
FIG. 4 is a flow chart showing the process in the image server of distributing data to the destination group members.

The image server 110, which has been directed to distribute data, first stores the received image data in the storage memory 113 as the image file 113*a* (FIG. 4, Steps S 40–S 41).

Then, the distribution managing means 112 searches the table 113*c* of distribution destination group names and file names on the basis of the received destination group name to specify the distribution destination group file name. Then, a destination domain name is picked out from the distribution destination group file 113*b* bearing the specified file name (FIG. 4, Steps S 42–S 43).

When the destination domain name is picked out, the distribution managing means 112 sends to the destination domain the aforesaid stored image file 113*a* together with a request to print. Directed to print, the digital multifunction apparatus prints the received image data on paper by image output means (FIG. 4, Steps S 44).

When the procedures in Steps 43 and 44 are over on all the domains belonging to destination group, the distribution managing means 112 erases the image file 113*a* on the storage memory 113, bringing the distribution process to an end (FIG. 4 Steps S 43–S 44–S45).

As set forth above, it is possible to distribute image data to a plurality of digital multifunction apparatuss belonging to a specific destination group from the digital multifunction apparatus 120.

(2. 1. 2) Process for Distribution to Specified Individual Destinations

Described under (2. 1. 1)—Process for distribution to a destination group—is the process for sending image data to the members of a specific group. In the present image data distribution system, it is possible to distribute image to specified individual destinations. In the following, the process to be taken in case where "0: To specify individual destinations" is selected on the dialog box for selection of a destination (FIG. 9) will be explained with the description limited to the points different from those under (2. 1. 1)—Process for distribution to a destination group.

Figure 10:
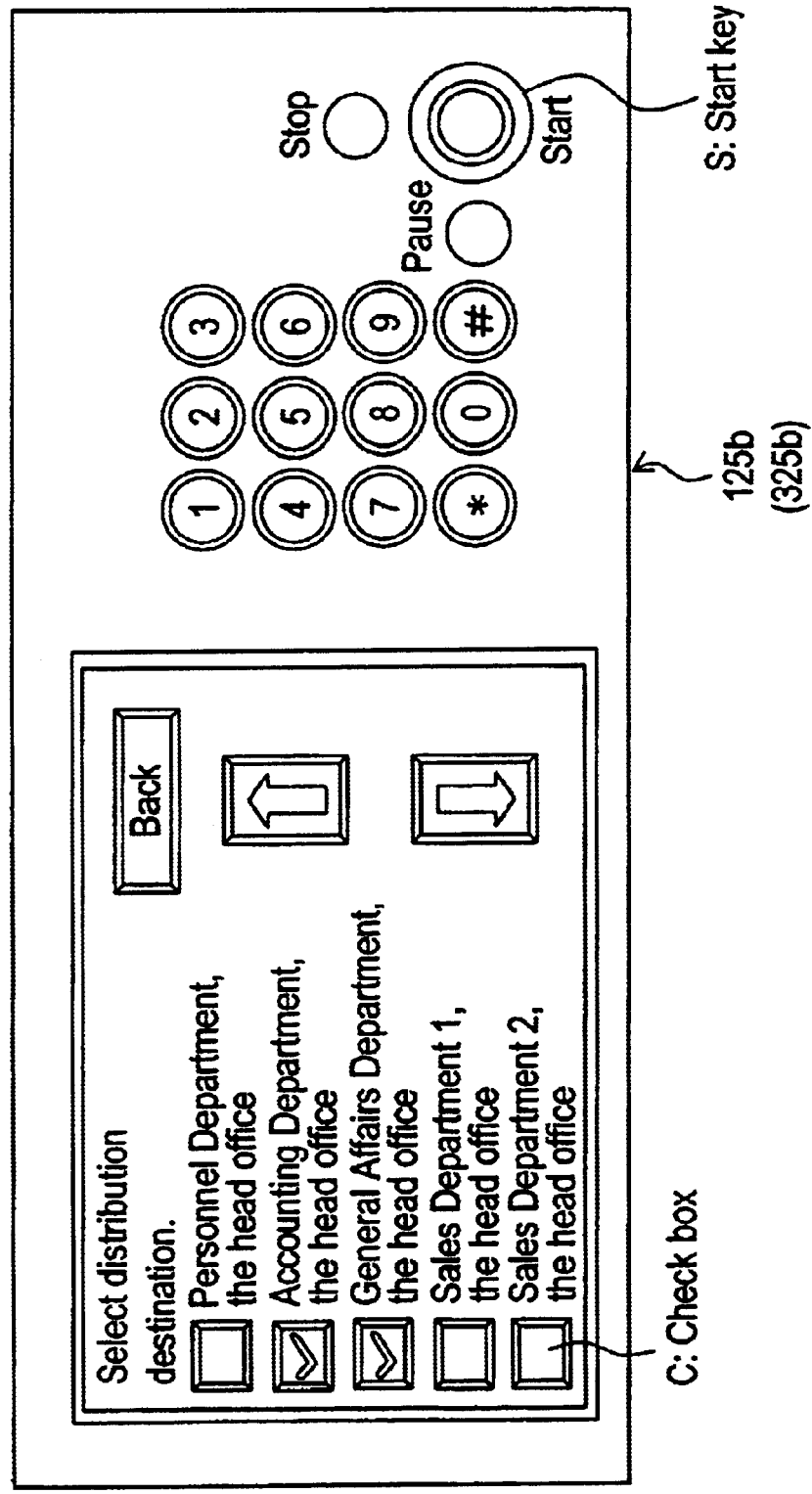
FIG. 10 is an illustration of a control panel with a dialog box for selection of individual destinations.

If "0" is selected on the dialog box for selection of a destination, the panel control means 125a in the digital multifunction apparatus 120 requests the image server 110 to send information on all distribution destinations. In answer, distribution managing means 112 of the image server 110 picks out all distribution destinations from the file "all. rec" on the storage memory 113 and sends the same to the digital multifunction apparatus 120. The panel control means 125a in the digital multifunction apparatus 120 then displays all distribution destinations on the dialog box for selection of individual destinations (FIG. 10). On this dialog box for selection of individual destinations, it is possible to view all the names of destinations by scrolling the screen.

The user then places a document to distribute on ADF, checks the check box C for the destinations and presses the start key S. When the start key S is pressed, the image file 128b is first stored in memory means 128. Then, the image file 128b is sent to the image server 110 together with the checked names of destinations and a request to distribute. The subsequent process—erasing the image file 128b from memory means 128 after completion of distribution—and the process on the image server 110 after receipt of the request to distribute are the same as already explained above. No description of those processes will be repeated.

As a result, the image data is sent to the destinations specified individually by the digital multifunction apparatus 120.

In the above description, it is so arranged that the image file first stored in memory means 128 or the storage memory 113 is erased after distribution But this arrangement is not restrictive. The image file 128b first stored in the digital multifunction apparatus 120 may be registered for future use instead of erasing In such a case, it is so arranged in the image data distribution system of the present invention that a mark sheet (FIG. 20) is printed out by image output means 121a as mentioned above. In other words, image managing means 126 informs image ID encoding means 123b of the image ID issued when the image data is first stored. Then, the image ID encoding means 123b converts the image ID into a bar code or a two-dimensional image ID mark and hands over this bar coded image data to the bar code synthesizing means 123a. The bar code synthesizing means 123a then copies the bar code image data at a specific position on the image data stored in the buffer 124 to produce an image data with the bar code inscribed therein. After that, the image data with the bar code is referred to the image output means 121a, which then prints out a market sheet.

(2. 2) Process for Distribution of the Image File Stored in the Storage Memory

Under (2. 1)—Process for distribution of image data—, there was described the process for distribution of the image data read by image input means 122a of the digital multifunction apparatus 120. In the present image data distribution system, it is also possible to distribute the image file 128b stored in the memory means 128 of the digital multifunction apparatus 120. There will now be described the process for distribution of the image file 128b on the memory means 128 using the mark sheet. The description is limited to the points where the present process is different from that under (2. 1)—Process for distribution of image data.

Figure 11:
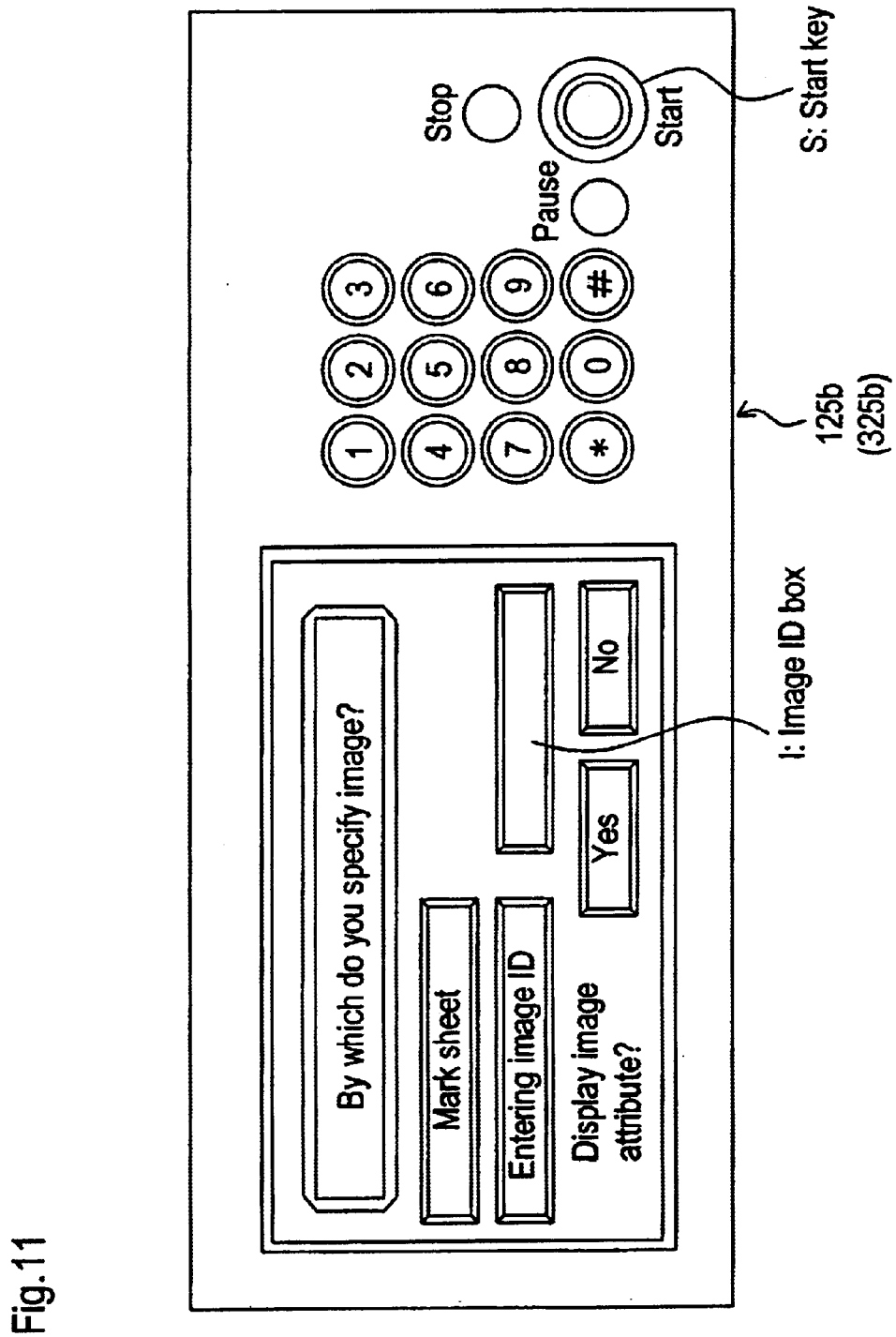
FIG. 11 is an illustration of a control panel with a dialog box for selection of the way of specifying images.

If, with the dialog box for selection of a destination (FIG. 8) displayed on the control panel 125b, the mode "Distribute file" is selected, then the panel control means 125a displays the dialog box for selection of the way of specifying images as shown in FIG. 11 on the control panel 125b. On that dialog box for selection of the way of specifying images, it is selected by which way an image file 128b on memory means 128 is to be specified: by "Mark sheet" or by "Entering image ID." To illustrate, to specify a data by "mark sheet," the mark sheet is placed on ADF and then the start key S is pressed. If data is to be specified by "Entering image data," the image ID is entered in the image ID box I by the ten keys and then the start key S is pressed.

In the above process, the image ID is referred to the image managing means 126 of the digital multifunction apparatus 120. That is, if "Mark sheet" is selected, then the image data with the bar code is stored in the buffer 124 by the image input means 122a and the image ID decoding means 123c decodes a specific position on the image data with the bar code stored in the buffer 124. The decoded image data is then referred to the image managing means 126. Meanwhile, in case the mode "Entering image ID," the panel control means 125a conveys the image ID entered in the image ID box I to the image managing means 126.

If the image ID is handed over to the image managing means 126, the dialog box for selection of a destination (FIG. 9) will appear on the control panel 125b. The subsequent procedures to be taken by the image server 110 after acquisition of the name of a destination group, selection of a destination and a request to distribute are the same as already described, and the description will not be repeated.

As set forth above, the image file 128b on the memory means 128 of the digital multifunction apparatus 120 can be distributed the same way as under (2. 1)—Process for distribution of image data (2. 3) Process for New Registration with Destination Group Described under (2. 1)—Process for distribution of image data—and (2. 2)—Process for distribution of the image file stored in the storage memory—, are examples of distributing image data to registered destinations—designation groups or specified individual destinations. The process for distribution to new destinations yet to be registered is followed the same way.

There will now be described an example of registering a digital multifunction apparatus 320 installed in the development department of the Osaka branch with the group "product development-related places." In the image data distribution system of the present invention, it is so configured that new registration procedure is taken at a digital multifunction apparatus to be newly registered. That is, in case a new destination—the development department of the Osaka office—is to be newly added to the group "product development-related places," the registration procedure is taken at the digital multifunction apparatus 320 in the Osaka office. But it is understood that information on the "development department of the Osaka branch" has been registered with the file "all. rec" within the image server 110.

If, with the dialog box for selection of a destination (FIG. 8) displayed on the panel control 325b of the digital multifunction apparatus 320 in the development department of the Osaka branch, the mode "Register with destination group" is selected, the panel control means 325a in the digital multifunction apparatus 320 directs the image server 110 to send the names of the destination groups. The distribution managing means 112 of the image server 110 then refers to the table 113c of distribution destination group names and file names and sends to the digital multifunction apparatus 320 the names of all the destination groups "all sales-related places," "all the sales offices" and "product development-related places" except for "all distribution destinations."

Figure 12:
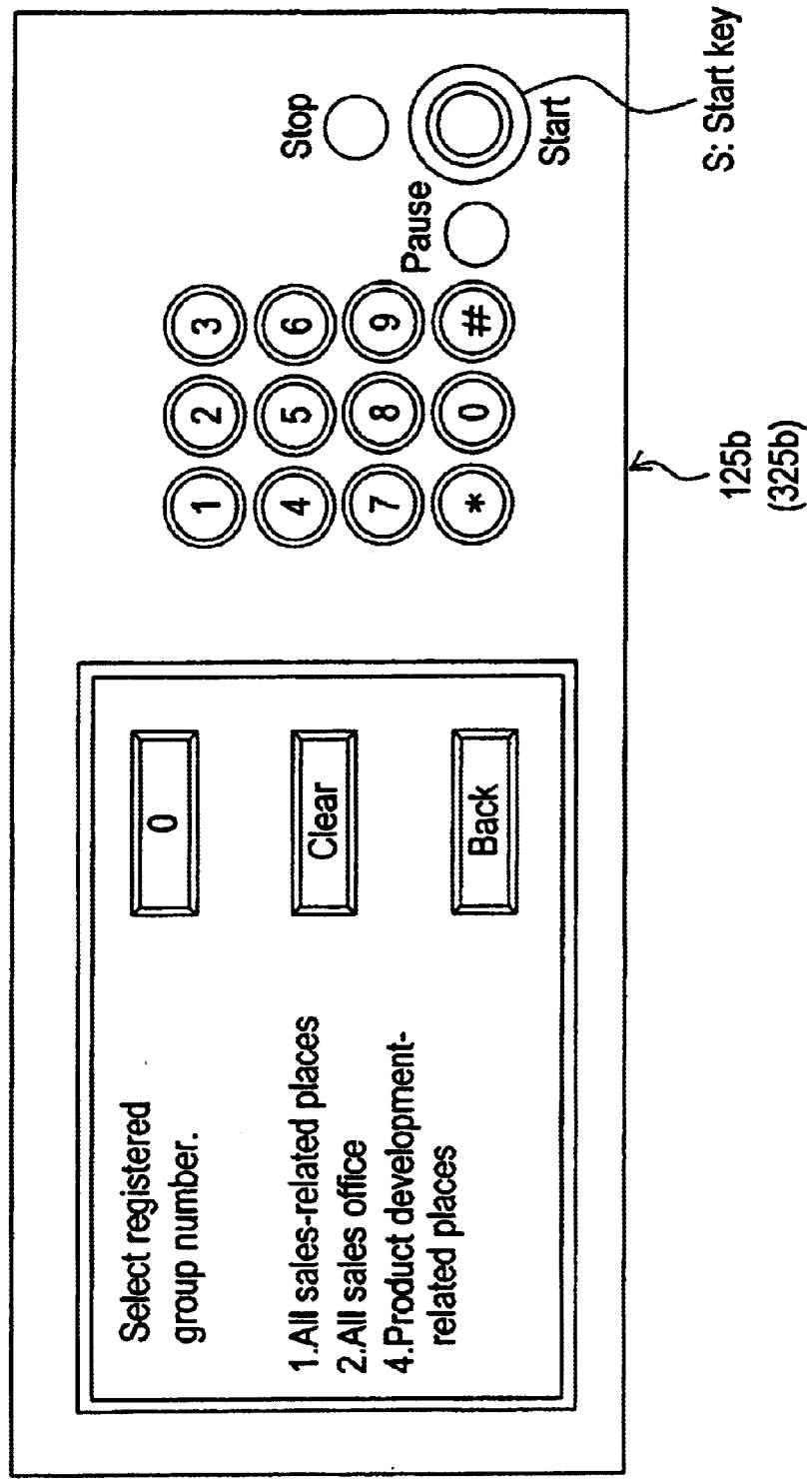
FIG. 12 is an illustration of a control panel with a dialog box for selection of a registered group.

The panel control means 325a of the digital multifunction apparatus 320 displays on the panel control 325b the dialog box for selection of a registered group (FIG. 12) on the basis of the received names of destination groups. If the user enters "3"—the number for the group "product development-related places"—for registration of the digital multifunction apparatus 320 by the ten keys and presses the start key S, the panel control means 325a will send to the image server 110 the name of the destination group "product development-related places" and the network domain name "dev11. osk. mei. co. jp" of its own image communication apparatus together with a request for registration with the group.

Receiving the request for registration with the group, the distribution managing means 112 of the image server 110 looks into the file "all. rec" on the storage memory 113 and picks out the "development department, the Osaka branch"—the destination name corresponding to the network domain name "dev11. osk. mei. co. jp" to be newly registered. Referring to the table 113c of distribution destination group names and file names, the distribution managing means 112 acquires the destination group file name "develop. rec" corresponding to the group name "development product-related places" where registration is made. Then, the information on the new destination "dev11. osk. mei. co. jp; the development department, the Osaka branch" will be added to the file "develop. rec."

As shown, it is possible to add a new destination from the digital multifunction apparatus to the destination groups managed in the image server 110.

(3) Other Distribution Examples

Under (2)—Various processes—, there were described examples of distribution processes by the digital multifunction apparatus. The image data distribution system of the present invention is not limited thereto. The same results can be achieved in embodiments using PC(personal computer), printing apparatus or facsimile unit connected to the network in place of the digital multifunction apparatus. There will now be described distribution processes by PC connected to the network to show an example of such embodiments.

(3. 1) Process for Distribution of Image Data by PC (3. 1. 1) Process for Distribution of Image Data from PC There will now be described the process for distribution, via the image server 110, of a document prepared on a software for preparation of documents such as a word processor that works on PC 160. The following description presupposes that PC 160 has a printer driver, that is, a printer driver software for distribution of document images installed therein.

If the user directs a document to be printed out from the software for preparation of documents, then the printer driver requests the image server 110 to send the destination group names and the destination names. It is understood that the network address of the image server 110 has been registered with the printer driver.

Figure 13:
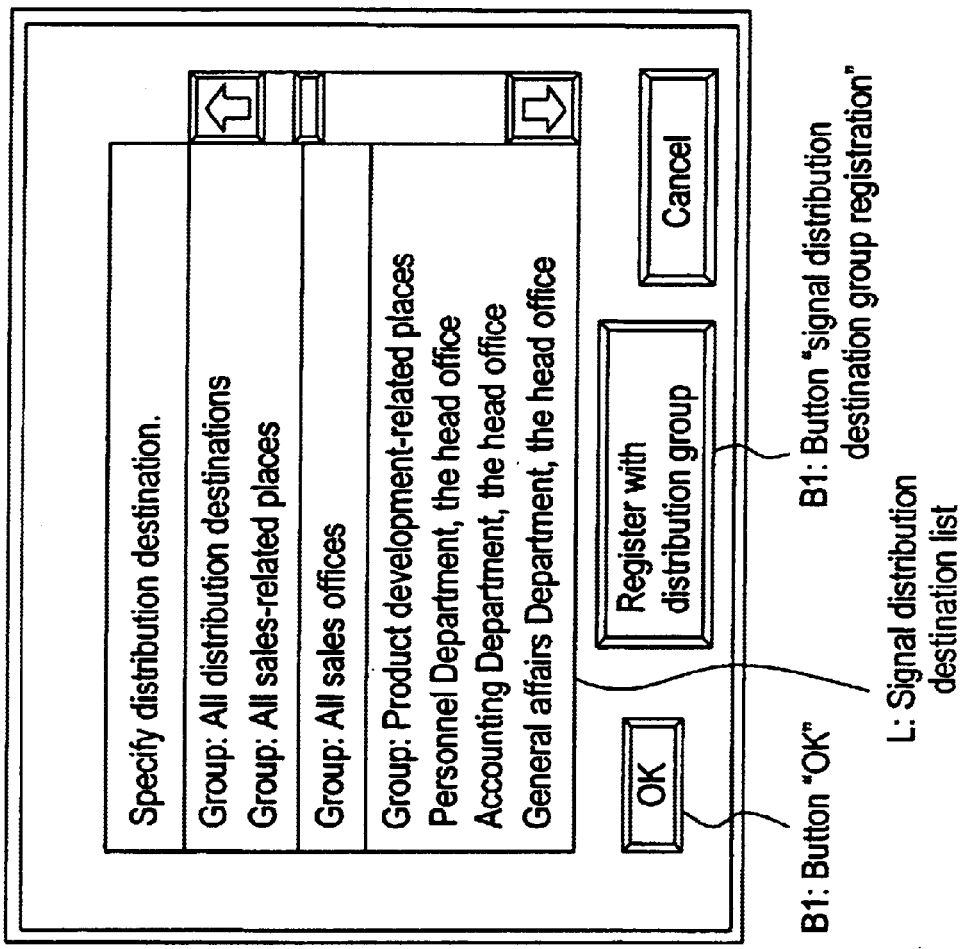
FIG. 13 is an illustration of a dialog box for specifying destinations on the computer screen.
Figure 21:
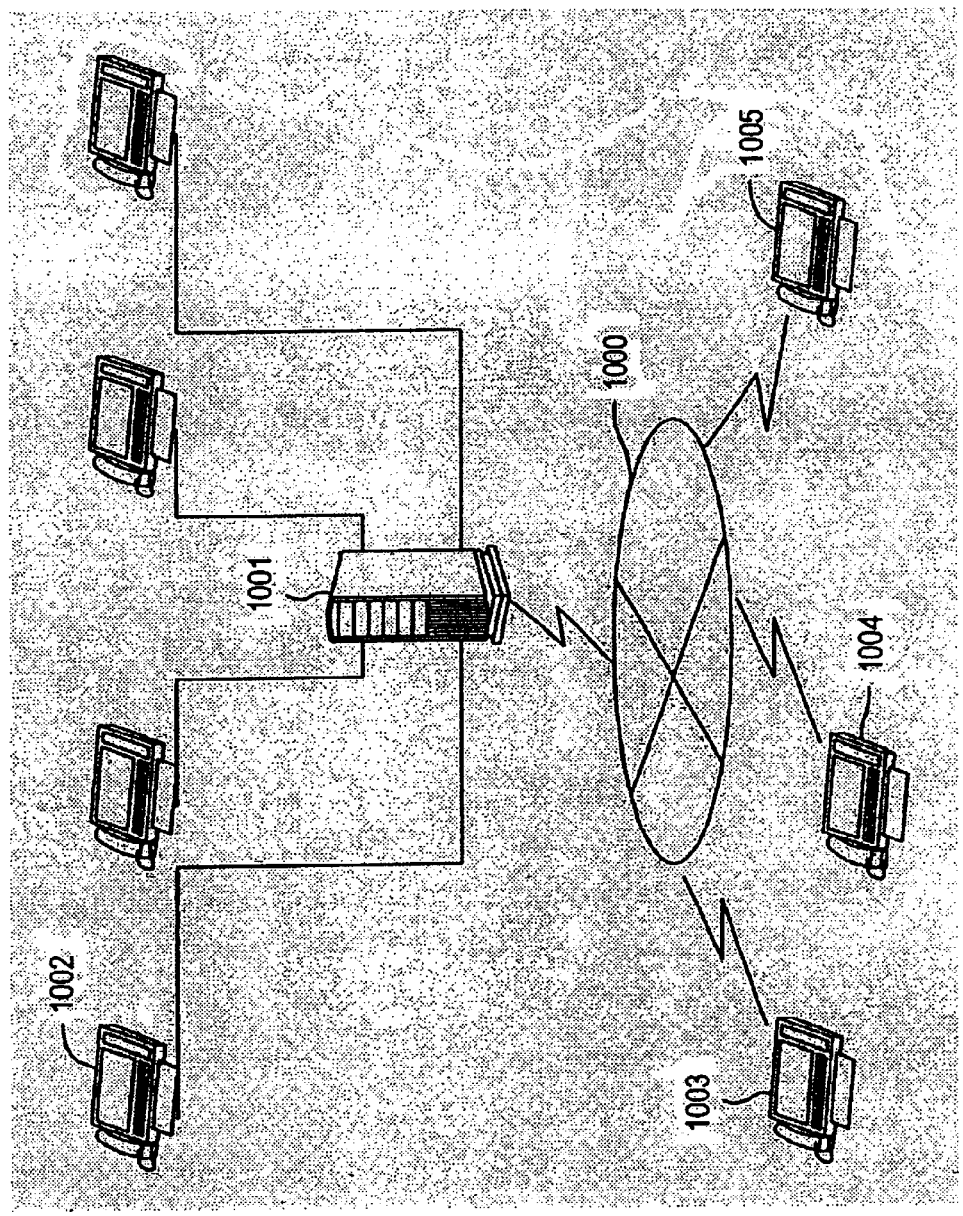
FIG. 21 is a block diagram showing the arrangement of the prior art image data distribution system.

Receiving the destination group names and the destination names from the distribution managing means 112 of the image server 110, the printer driver displays a dialog box for specifying a destination as shown in FIG. 13 as on display means such as a display.

If the user selects a destination from the distribution destination list L displayed on the dialog box for specifying a destination and presses the "OK" button, the printer driver converts the document prepared on the software for preparation of documents into bitmap data and stores the document in storage means such as hard disk as image file. When the storage in storage means is over, the printer driver sends to the image server 110 the selected destination name, the destination group name and the image file on the storage means along with a request for distribution.

The subsequent steps, that is, the process in the image server 110 after receipt of the request for distribution, are the same as described under (2. 1)—Process for distribution of image data.

As set forth above, it is possible to distribute documents prepared on a document preparation software that works on PC—the same way as (2. 1)—Process for distribution of image data.

The process to be followed in case the button B2 "Register with destination group" is pressed on the dialog box for selection of registered groups (FIG. 13) is the same as (2. 3)—Process for new registration with destination group—and the description will not be repeated.

(3. 1. 2) Receiving Distribution Images by PC

The process will be explained of PC 160 receiving image data distributed from the image server 110. The following description presupposes that the software for receiving distribution images works on the background of PC 160.

Figure 5:
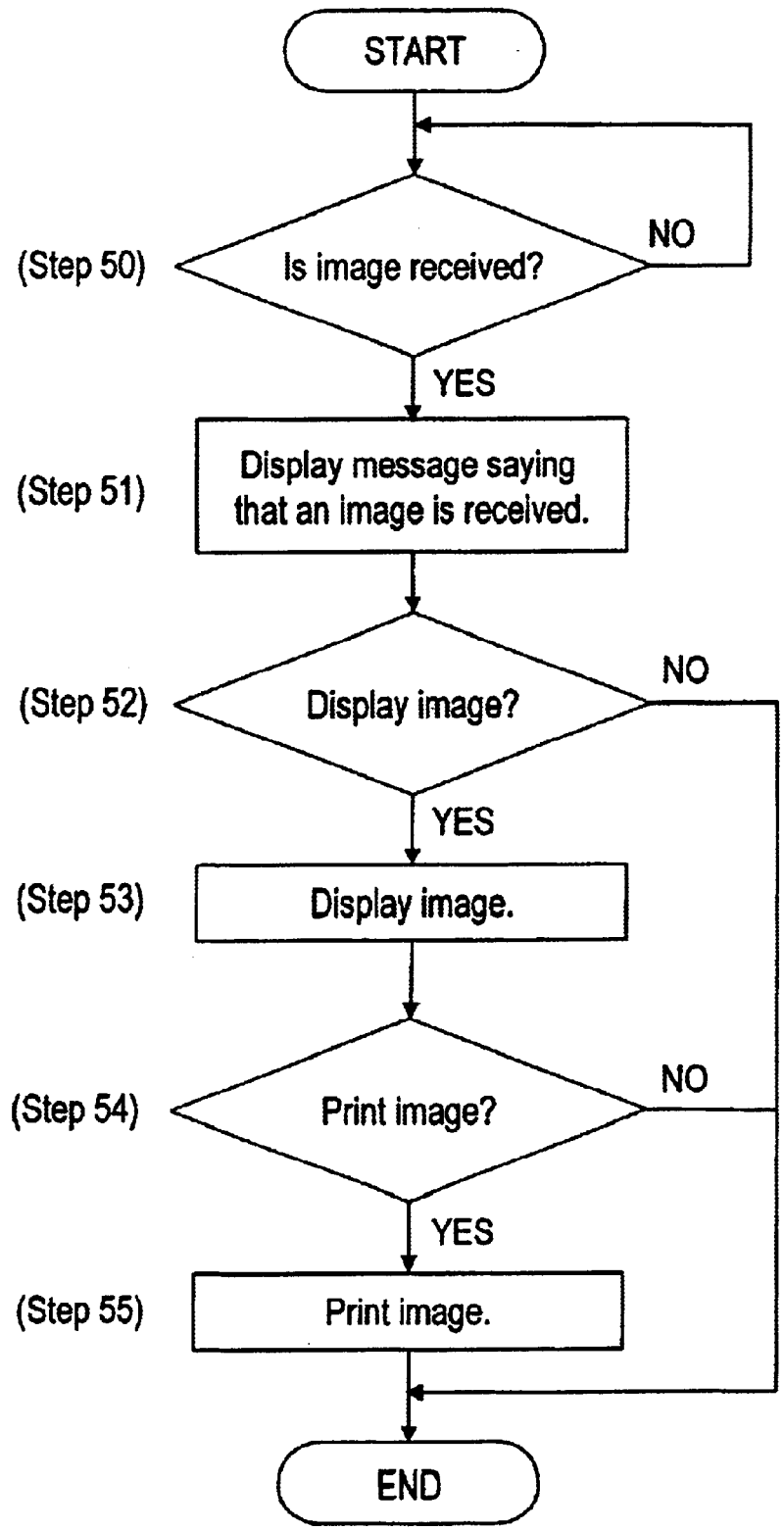
FIG. 5 is a flow chart showing the process of receiving data at a personal computer.

First, the software for receiving distributed images on PC 160 which has received image data from the distribution managing means 112 of the image server 110 first displays a dialog box for selection (not shown)—asking whether to display the received image data—along with a message to the effect that the distributed image is received (FIG. 5, Steps S 50–S 51–S 52).

If, on the dialog box for selection, the user directs the received image data to be displayed, PC 160 displays on display means the image data by using TIFF image viewer software. The TIFF image viewer software in general use will serve the purpose (FIG. 5, Steps S 53).

If the user judges that the image displayed by the display means needs to be printed, he or she prints out the data using a printer connected to PC 160 directly or via the network (FIG. 5, Steps S 54–S 55).

As set forth above, the application of the image data distribution system of the present invention is not limited to the digital multifunction apparatus but is applicable to PC and a printing apparatus connected to the network.

Under (3. 1. 1)—Process for distribution of image data from PC—, there was described an example of the process for distribution of a document prepared on-a document preparation software that works on PC 160. That is not restrictive. The process works with image files stored in storage means in PC 160, image data and the like from a scanner or facsimile unit connected to PC 160. It is also noted that the description under (2. 3)—Process for new registration with destination group—was about the configuration in which a new destination is added to a destination group from the digital multifunction apparatus 320. In addition, it is desirable to so arrange that a specific destination can be erased—to withdraw registration—from the destination group. That is, the registration can be removed by this way. The destination group name, the network domain name of the image communication apparatus as well as a request for erasure are sent to the image server 110 from the digital multifunction apparatus 320 so that the distribution managing means 112 of the image server 110 eliminates information corresponding to the received network domain name from the distribution destination group file 113b on the received destination group name.

The examples just described use the following as the distribution destination group files 113b: "all. rec," "eigyou_all. rec." "eigyou_syo. rec" and "develop. rec" files. But the image data distribution system of the present invention is not limited to that. In other words, at least one distribution destination group file 113b only needs to be used. With the file "all. rec" alone as the distribution destination group file 113b, for example, the same results can be produced except that the destination group is only one.

In the above descriptions, furthermore, the contents in the table 113c of distribution destination group names and file names retained on the storage memory 113 of the image server 110 are fixed. But the image data distribution system of the present invention is not limited to that. It may be so configured that the distribution managing means 112 will prepare a table 113c of distribution destination group names and file names according to a request for distribution or a request for group registration. If, for example, the distribution managing means 112, which has received a request from the digital multifunction apparatus 120 to send back information on the distribution destination groups, searches out all the files of the extension rec in a specific directory in the storage memory 113. From the searched files, the contents in the first comments lines are picked out. In the search, the applicable files are "all. rec," "eigyou_all. rec," "eigyou_syo. rec" and "develop. rec" files. And the contents in the comments lines to be picked out are the destination group names "all distribution destinations," "all sales-related places," "all sales offices" and "product development-related places." Therefore, the distribution managing means 112 is able to prepare a table 113c of distribution destination group names and file names as shown in FIG. 18. That way, changes in the destination group as when a destination group file is added or eliminated by the system operator can be reflected on the table 113c of distribution destination group names and file names.

As set forth above, it is possible to newly register the own digital multifunction apparatus with the desired destination group according to the present invention. Changes in destination image communication apparatuses can be dealt with efficiently. Furthermore, no manual procedure as, for example, manual entering of the facsimile number is involved in new registration, and therefore reliable operation can always be hoped for.

In addition, image data is distributed through the network which offers such advantages as shortened transmission time, saved transmission cost and high-resolution image distribution.

Furthermore, not only an apparatus for inputting and outputting paper but also a variety of equipment including the personal computer may be used as the source or destination image communication apparatus. That facilitates the build-up of a system.

What is claimed is:

1. An image data distribution system wherein an image server has information on destination groups formed of members selected from among a plurality of digital multifunction apparatus which include a printing function to print image data from the image sever, the plurality of digital multifunction apparatus being connected to the image server via network, and the information being memorized on a storage, and wherein the image data will be sent out to the respective members of the destination group specified by the destination information, said system comprising:

input manipulation means, provided in each digital multifunction apparatus, which can request the image server to send back all the destination groups, and specify a specific group from among all the destination groups sent back from the image server, and send to the image server at least the specified group together with a group registration request to register the digital multifunction apparatus with the specified group after specifying the group; and distribution managing means, provided on the side of the image server, which sends to the digital multifunction apparatus all the destination groups according to the request sent from the digital multifunction apparatus to send all the destination groups, and after a destination group is specified by the digital multifunction apparatus, registers the digital multifunction apparatus with the specified destination group, wherein the digital multifunction apparatus communicates with the image server via the network and the digital multifunction apparatus is specified by a data identifying the digital multifunction apparatus on the network.

2. The image data distribution system as defined in claim 1, wherein said digital multifunction apparatus is provided with image input means for reading a document and sends image data from said image input means to the image server.

3. The image data distribution system as defined in claim 1, wherein said digital multifunction apparatus is provided with storage means for storing image data and sends image data from said storage means to the image server.

4. The image data distribution system as defined in claim 1, wherein said digital multifunction apparatus includes transmit-receive means and sends image data from said transmit-receive means to the image server.

5. An image data distribution method wherein an image server has information on destination groups formed of members selected from among a plurality of digital multifunction apparatus which include a printing function to print image data from the image sever, the plurality of digital multifunction apparatus being connected to the image server via network, and the information being memorized on a storage, and wherein the image data will be sent out to the respective members of the destination group specified by the destination information, said method comprising:

requesting from a digital multifunction apparatus for the image server to send back all the destination groups;

sending all the destination groups from said image server to said digital multifunction apparatus in response to the request from the digital multifunction apparatus for sending all the destination groups;

sending from an input manipulation means provided in the digital multifunction apparatus a request for registration of the digital multifunction apparatus with a destination group, and at least a specified destination group specified by the digital multifunction apparatus; and registering said digital multifunction apparatus with the specified destination group according to the group registration request and the specified destination group sent from said digital multifunction apparatus, wherein the digital multifunction apparatus communicates with the image server via the network and the digital multifunction apparatus is specified by a data identifying the digital multifunction apparatus on the network.

* * * * *